(12) United States Patent
Lee et al.

(10) Patent No.: US 10,688,449 B2
(45) Date of Patent: Jun. 23, 2020

(54) METHOD FOR MANUFACTURING WATER TREATMENT SEPARATOR, WATER TREATMENT SEPARATOR MANUFACTURED USING SAME, AND WATER TREATMENT MODULE COMPRISING WATER TREATMENT SEPARATOR

(71) Applicant: LG CHEM, LTD., Seoul (KR)

(72) Inventors: Byoungsoo Lee, Daejeon (KR); Taehyeong Kim, Daejeon (KR); Hyungjoon Jeon, Daejeon (KR); Youngju Lee, Daejeon (KR); Chong Kyu Shin, Daejeon (KR); Bong Ju Kwak, Daejeon (KR)

(73) Assignee: LG CHEM, LTD., Seoul (KR)

( * ) Notice: Subject to any disclaimer, the term of this patent is extended or adjusted under 35 U.S.C. 154(b) by 261 days.

(21) Appl. No.: 15/770,859

(22) PCT Filed: May 18, 2017

(86) PCT No.: PCT/KR2017/005159
§ 371 (c)(1),
(2) Date: Apr. 25, 2018

(87) PCT Pub. No.: WO2017/200313
PCT Pub. Date: Nov. 23, 2017

(65) Prior Publication Data
US 2018/0318765 A1 Nov. 8, 2018

(30) Foreign Application Priority Data

May 18, 2016 (KR) .................. 10-2016-0061092
May 17, 2017 (KR) .................. 10-2017-0061255

(51) Int. Cl.
| | | |
|---|---|---|
| B01D 71/56 | (2006.01) | |
| B01D 71/58 | (2006.01) | |
| B01D 71/76 | (2006.01) | |
| B01D 71/38 | (2006.01) | |
| B01D 61/02 | (2006.01) | |
| B01D 67/00 | (2006.01) | |
| B01D 69/10 | (2006.01) | |
| B01D 69/12 | (2006.01) | |
| C02F 1/44 | (2006.01) | |
| B01D 69/02 | (2006.01) | |
| B01D 65/08 | (2006.01) | |

(52) U.S. Cl.
CPC ............ *B01D 71/56* (2013.01); *B01D 61/025* (2013.01); *B01D 61/027* (2013.01); *B01D 65/08* (2013.01); *B01D 67/0006* (2013.01); *B01D 67/0088* (2013.01); *B01D 69/02* (2013.01); *B01D 69/10* (2013.01); *B01D 69/125* (2013.01); *B01D 71/38* (2013.01); *B01D 71/58* (2013.01); *B01D 71/76* (2013.01); *C02F 1/441* (2013.01); *B01D 67/0093* (2013.01); *B01D 2239/0421* (2013.01); *B01D 2323/40* (2013.01); *B01D 2325/20* (2013.01); *B01D 2325/28* (2013.01); *C02F 1/44* (2013.01)

(58) Field of Classification Search
CPC .... B01D 61/025; B01D 61/027; B01D 65/08; B01D 67/0088; B01D 67/0093; B01D 67/0006; B01D 69/02; B01D 69/10; B01D 69/125; B01D 71/38; B01D 71/56; B01D 71/58; B01D 71/76; B01D 2239/0421; B01D 2323/40; B01D 2325/20; B01D 2325/28; C02F 1/44; C02F 1/441
See application file for complete search history.

(56) References Cited

U.S. PATENT DOCUMENTS

| | | |
|---|---|---|
| 4,978,455 A | 12/1990 | McCray |
| 2012/0211414 A1 | 8/2012 | Koo et al. |
| 2013/0287946 A1 | 10/2013 | Jons et al. |

(Continued)

FOREIGN PATENT DOCUMENTS

| | | |
|---|---|---|
| CN | 104959046 A | 10/2015 |
| EP | 0391519 B1 | 7/1994 |
| KR | 10-2005-0103992 | 11/2005 |

(Continued)

OTHER PUBLICATIONS

Liu, et al.: "Improving fouling resistance and chlorine stability of aromatic polyamide thin-film composite RO membrant, by surface grafting of polyvinyl alcohol (PVA)", XP029216602, Desalination, Elsevier Science Publishers B.V, vol. 367, Mar. 28, 2015, pp. 11-20.

(Continued)

*Primary Examiner* — John Kim
(74) *Attorney, Agent, or Firm* — Dentons US LLP

(57) ABSTRACT

The present specification provides a method for manufacturing a water-treatment separation membrane, the method comprising: preparing a porous support; forming a polyamide active layer on the porous support by using an interfacial polymerization of an aqueous solution comprising an amine compound and an organic solution comprising an acyl halide compound; and coating a coating solution comprising a random copolymer comprising the monomers represented by Chemical Formulae 1 to 3 onto the polyamide active layer, in which a content of the random copolymer is 0.5 wt % to 2 wt % based on a total weight of the coating solution, a water-treatment separation membrane manufactured by using the same, and a water treatment module comprising the water-treatment separation membrane.

8 Claims, No Drawings

(56) References Cited

U.S. PATENT DOCUMENTS

2017/0247265 A1 8/2017 Fujita et al.

FOREIGN PATENT DOCUMENTS

| KR | 10-2012-0095235 | 8/2012 |
| KR | 10-2013-0076498 | 7/2013 |
| KR | 10-2014-0005489 | 1/2014 |
| KR | 10-2014-0016272 | 2/2014 |
| WO | 2014/107523 A2 | 7/2014 |
| WO | 2016/017754 A1 | 2/2016 |

OTHER PUBLICATIONS

Zhang, et al.: "Effect of poly(vinyl alcohol) coating process conditions on the properties and performance of polyamide reverse osmosis membranes", XP029324219, Desalination, Elsevier Science Publishers B.V, vol. 379, Oct. 31, 2015, pp. 42-52.

METHOD FOR MANUFACTURING WATER TREATMENT SEPARATOR, WATER TREATMENT SEPARATOR MANUFACTURED USING SAME, AND WATER TREATMENT MODULE COMPRISING WATER TREATMENT SEPARATOR

TECHNICAL FIELD

This application is a National Stage filing under 35 U.S.C. 371 of International Application No. PCT/KR2017/005159 filed on May 18. 2017, and claims the benefit of priority of Korean Patent Application No. 10-2016-0061092 filed with the Korean Intellectual Property Office on May 18, 2016 and Korean Patent Application No, 10-2017-0061255 filed on May 17, 2017 with the Korean intellectual Property Office, the entire contents of which are incorporated herein by reference.

The present specification relates to a method for manufacturing a water-treatment separation membrane, a water-treatment separation membrane manufactured by using the same, and a water treatment module comprising the water-treatment separation membrane.

BACKGROUND ART

An osmosis phenomenon refers to a phenomenon in which a solvent moves between two solutions divided by a semipermeable membrane from a solution having a low solute concentration to the other solution having a high solute concentration by passing through the separation membrane, and in this case, pressure acting on the side of the solution having a high solute concentration through the movement of the solvent refers to osmotic pressure. However, when external pressure which is higher than osmotic pressure is applied, the solvent moves towards the solution having a low solute concentration, and such a phenomenon refers to reverse osmosis. Various salts or organic materials may be separated by a semipermeable membrane by means of a pressure gradient as a driving force using the principle of reverse osmosis. A water-treatment separation membrane using the reverse osmosis phenomenon has been used to separate a molecular-level material and remove salts from salt water or sea water and supply water for domestic, construction and industrial purposes.

Representative examples of the water-treatment separation membrane comprise a polyamide-based water-treatment separation membrane, the polyamide-based water-treatment separation membrane is manufactured by a method of forming a polyamide active layer on a microporous layer support, and more particularly, the polyamide-based water-treatment separation membrane is manufactured by forming a polysulfone layer on a non-woven fabric to form a microporous support, dipping the microporous support in an aqueous m-phenylene diamine (mPD) solution to form an mPD layer, and dipping the microporous support again in a trimesoyl chloride (TMC) organic solvent and bringing the mPD layer into contact with the TMC to form a polyamide layer by using an interfacial polymerization.

CITATION LIST

Patent Document

Korean Patent Application Laid-Open No. 2014-0005489

DETAILED DESCRIPTION OF THE INVENTION

Technical Problem

The present specification has been made in an effort to provide a water-treatment separation membrane having an improved salt rejection and an improved flux, and a method for manufacturing the same.

Technical Solution

An exemplary embodiment of the present specification provides a method for manufacturing a water-treatment separation membrane, the method comprising: preparing a porous support; forming a polyamide active layer on the porous support by using an interfacial polymerization of an aqueous solution comprising an amine compound and an organic solution comprising an acyl halide compound; and coating a coating solution comprising a random copolymer comprising a monomer of the following Chemical Formula 1, a monomer of the following Chemical Formula 2, and a monomer of the following Chemical Formula 3 onto the polyamide active layer, in which a content of the random copolymer is 0.5 wt % to 2 wt % based on a total weight of the coating solution.

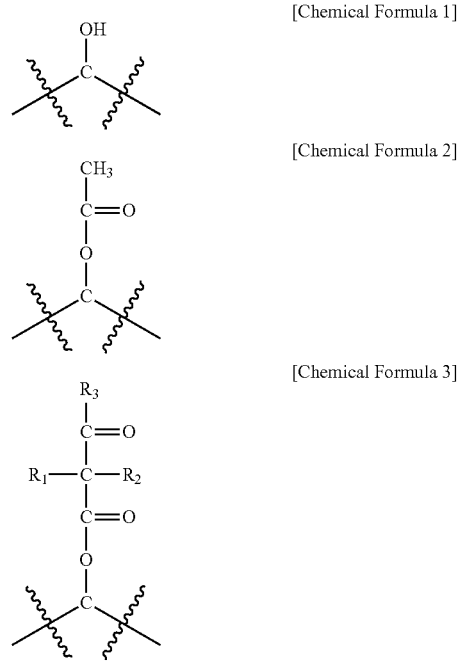

[Chemical Formula 1]

[Chemical Formula 2]

[Chemical Formula 3]

In Chemical Formulae 1 to 3,
a content of the monomer of Chemical Formula 1 is 70 wt % to 90 wt % based on the entire random copolymer,
a content of the monomer of Chemical Formula 2 is 5 wt % to 25 wt % based on the entire random copolymer,
a content of the monomer of Chemical Formula 3 is 5 wt % to 25 wt % based on the entire random copolymer, and
$R_1$ to $R_3$ are the same as or different from each other, and are each independently hydrogen; or a substituted or unsubstituted alkyl group.

Further, an exemplary embodiment of the present specification provides a water-treatment separation membrane manufactured by the above-described manufacturing method, the water-treatment separation membrane comprising: a porous support; a polyamide active layer disposed on the porous support; and a coating layer comprising the above-described random copolymer comprising the monomers represented by Chemical Formulae 1 to 3 on the polyamide active layer.

Advantageous Effects

A reverse osmosis membrane manufactured by a manufacturing method according to an exemplary embodiment of the present specification has an excellent permeation flux and an excellent salt rejection. Further, when a reverse osmosis membrane is manufactured according to an exemplary embodiment of the present specification, a reverse osmosis membrane having excellent durability and fouling resistance may be manufactured by comprising an acetoacetyl-based compound in a coating solution.

BEST MODE

Hereinafter, the present specification will be described in more detail.

When one member is disposed "on" another member in the present specification, this comprises not only a case where the one member is brought into contact with another member, but also a case where still another member is present between the two members.

When one part "comprises" one constituent element in the present specification, unless otherwise specifically described, this does not mean that another constituent element is excluded, but means that another constituent element may be further comprised.

Examples of the substituents in the present specification will be described below, but are not limited thereto.

In the present specification,

means a moiety linked to another substituent.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term "substituted or unsubstituted" means being substituted with one or two or more substituents selected from the group consisting of hydrogen; deuterium; a halogen group; a nitrile group; and a substituted or unsubstituted alkyl group, or having no substituent.

In the present specification, a halogen group may be fluorine, chlorine, bromine, or iodine.

In the present specification, the alkyl group may be straight or branched, and the number of carbon atoms thereof is not particularly limited, but is preferably 1 to 20. Specific examples thereof comprise methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, iso-pentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto.

An exemplary embodiment of the present specification provides a method for manufacturing a water-treatment separation membrane, the method comprising: preparing a porous support; forming a polyamide active layer on the porous support by using an interfacial polymerization of an aqueous solution comprising an amine compound and an organic solution comprising an acyl halide compound; and coating a coating solution comprising a random copolymer comprising a monomer of the following Chemical Formula 1, a monomer of the following Chemical Formula 2, and a monomer of the following Chemical Formula 3 onto the polyamide active layer, in which a content of the random copolymer is 0.5 wt % to 2 wt % based on a total weight of the coating solution.

[Chemical Formula 1]

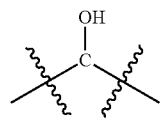

[Chemical Formula 2]

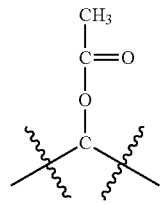

[Chemical Formula 3]

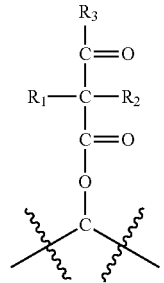

In Chemical Formulae 1 to 3, a content of the monomer of Chemical Formula 1 is 70 wt % to 90 wt % based on the entire random copolymer, a content of the monomer of Chemical Formula 2 is 5 wt % to 25 wt % based on the entire random copolymer, a content of the monomer of Chemical Formula 3 is 5 wt % to 25 wt % based on the entire random copolymer, and $R_1$ to $R_3$ are the same as or different from each other, and are each independently hydrogen; or a substituted or unsubstituted alkyl group.

The monomers of Chemical Formulae 1 to 3 may be continuously linked to each other, and the same monomers may be repeatedly linked to each other, or different monomers may be linked to each other.

According to an exemplary embodiment of the present specification, as the porous support, it is possible to use a porous support in which a coating layer of a polymer material is formed on a non-woven fabric. As the polymer material, it is possible to use, for example, polysulfone, polyethersulfone, polycarbonate, polyethylene oxide, polyimide, polyetherimide, polyether ether ketone, polypropylene, polymethylpentene, polymethyl chloride, polyvinylidene fluoride, and the like, but the polymer material is not limited thereto. Specifically, as the polymer material, polysulfone may be used.

According to an exemplary embodiment of the present specification, the porous support may have a thickness of 60 µm to 100 µm, but the thickness is not limited thereto, and may be adjusted, if necessary. Further, it is preferred that the porous support has a pore size of 1 nm to 500 nm, but the pore size is not limited thereto.

According to an exemplary embodiment of the present specification, the polyamide active layer may be formed through forming an aqueous solution layer comprising an amine compound on a porous support; and forming a polyamide active layer by bringing an organic solution comprising an acyl halide compound into contact with the aqueous solution layer comprising the amine compound.

According to an exemplary embodiment of the present specification, when the aqueous solution layer comprising the amine compound is brought into contact with the organic solution comprising the acyl halide compound, polyamide is produced by an interfacial polymerization while the amine compound and the acyl halide compound, which are coated on the surface of the aqueous solution layer, are reacted with each other, and the polyamide is adsorbed on the microporous support, so that a thin film is formed. Further, according to an exemplary embodiment of the present specification, an active layer may be formed by bringing the organic solution comprising the acyl halide compound into contact with the aqueous solution layer comprising the amine compound by means of a method such as dipping, spray, or coating.

According to an exemplary embodiment of the present specification, the method of forming an aqueous solution layer comprising an amine compound on the porous support is not particularly limited, and the method may be used without limitation as long as the method may form an aqueous solution layer on a support. Specifically, examples of the method of forming the aqueous solution layer comprising the amine compound on the porous support comprise spraying, application, dipping, dropwise addition, and the like.

According to an exemplary embodiment of the present specification, the aqueous solution layer may be additionally subjected to removing an excess aqueous solution comprising an amine compound, if necessary. The aqueous solution layer formed on the porous support may be non-uniformly distributed when the aqueous solution present on the porous support is present in an excessive amount, and when the aqueous solution is non-uniformly distributed, a non-uniform active layer may be formed by a subsequent interfacial polymerization. Accordingly, after the aqueous solution layer is formed on the support, it is preferred to remove an excess aqueous solution. The removal of the excess aqueous solution is not particularly limited, but may be performed by using, for example, a sponge, an air knife, a nitrogen gas blowing, natural drying, or a compression roll, and the like.

The amine compound in the aqueous solution comprising the amine compound is not limited as long as the amine compound may be used for a polymerization of polyamide, but as a specific example, it is possible to preferably use m-phenylenediamine (mPD), p-phenylenediamine (PPD), 1,3,6-benzenetriamine (TAB), 4-chloro-1,3-phenylenediamine, 6-chloro-1,3-phenylenediamine, 3-chloro-1,4-phenylenediamine, or a mixture thereof. The content of the amine compound may be 0.1 wt % or more and 20 wt % or less based on 100 wt % of the composition.

The acyl halide compound is not limited as long as the acyl halide compound may be used for a polymerization of polyamide, but specific examples thereof comprise an aromatic compound having two to three carboxylic acid halides, and it is possible to preferably use one or a mixture of two or more selected from the compound group consisting of trimesoyl chloride, isophthaloyl chloride, and terephthaloyl chloride. The content of the acyl halide compound may be 0.05 wt % or more and 1 wt % or less based on 100 wt % of the composition.

In an exemplary embodiment of the present invention, since the random copolymer, which is comprised in the coating solution and comprises the monomer of Chemical Formula 1, the monomer of Chemical Formula 2, and the monomer of Chemical Formula 3, can be crosslinked to unreacted functional groups present in the active layer and self-crosslinked to each other, so that the active layer used for a long period of time is prevented from being brought into direct contact with raw water, thereby securing sustained performance by increasing durability of the active layer.

The monomer of Chemical Formula 1 serves to prevent the surface of the active layer in a water-treatment separation membrane from being damaged and protect the active layer for a long period of time, and the content thereof in the random copolymer may be 70 wt % to 90 wt %. The monomer of Chemical Formula 2 is an intermediate obtained by modifying the monomer of Chemical Formula 1 in order to synthesize the monomer of Chemical Formula 3, and the content thereof in the random copolymer may be 5 wt % to 25 wt % depending on the degree of reaction.

The monomer of Chemical Formula 3 can be crosslinked to unreacted functional groups present in the active layer and self-crosslinked to each other, and serves to prevent the coating solution from being easily removed from the active layer. The content of the monomer of Chemical Formula 3 in the random copolymer may be 5 wt % to 25 wt %, and when the content is more than 25 wt %, the flux is sharply decreased, and as a result, when the content is within the range, the effect of a water-treatment separation membrane protective layer is excellent.

It is determined that the reason why a salt rejection is sharply decreased and a flux is slightly decreased when the content of the random copolymer is less than 0.5 wt % is that the active layer cannot properly serve as the protective layer due to insufficiency of the absolute amount of the compound coated onto the surface of the active layer, and it is determined that the reason why a salt rejection is slightly decreased and a flux is sharply decreased when the content is more than 2 wt % is that performance deteriorates due to a change in surface physical properties by the compound to be coated in an excessive amount on the surface of the active layer. However, it is possible to apply the content of the random copolymer to a water-treatment separation membrane having a low degrade in terms of increasing the durability.

The random copolymer may have a molecular weight (MW) of 20,000 to 40,000, preferably 25,000 to 35,000.

According to an exemplary embodiment of the present specification, the solvent of the coating solution may be a hydrophilic solvent, preferably distilled water.

According to an exemplary embodiment of the present specification, a method of forming a coating solution on the polyamide active layer is not particularly limited, and may be used without limitation as long as the method may form a coating layer on a polyamide active layer. Specifically, examples of the method of forming a coating layer on the polyamide active layer comprise a method of performing a treatment such as spraying, application, dipping, and dropwise addition, and then performing drying.

According to an exemplary embodiment of the present specification, the coating layer may be additionally subjected to removing an excess coating solution, if necessary. The coating layer formed on the polyamide active layer may be non-uniformly distributed when a coating solution present on a support is present in an excessive amount. Accordingly, it is preferred that the excess coating solution is removed after a coating layer is formed on the polyamide active layer. The removal of the excess coating solution is not particularly limited, but may be performed by using, for example, a sponge, an air knife, a nitrogen gas blowing, natural drying, or a compression roll, and the like.

According to an exemplary embodiment of the present specification, $R_1$ to $R_3$ are the same as or different from each other, and may be each independently hydrogen; or a substituted or unsubstituted alkyl group having 1 to 20 carbon atoms.

According to an exemplary embodiment of the present specification, $R_1$ and $R_2$ may be hydrogen.

An end group of the random copolymer may be a straight or branched alkyl group, and specific examples thereof comprise methyl, ethyl, propyl, and the like, but are not limited thereto.

An exemplary embodiment of the present specification provides a water-treatment separation membrane manufactured by the above-described manufacturing method, the water-treatment separation membrane comprising: a porous support; a polyamide active layer disposed on the porous support; and the above-described random copolymer comprising the monomer of Chemical Formula 1, the monomer of Chemical Formula 2, and the monomer of Chemical Formula 3 on the polyamide active layer.

The water-treatment separation membrane may further comprise an additional layer, if necessary, and for example, the water-treatment separation membrane may further comprise an anti-fouling layer disposed on the polyamide active layer.

According to an exemplary embodiment of the present specification, the water-treatment separation membrane may be used as a microfiltration membrane, an ultrafiltration membrane, a nanofiltration membrane, or a reverse osmosis membrane, and the like, and specifically, the water-treatment separation membrane may be used as a reverse osmosis membrane.

An exemplary embodiment of the present specification provides a water treatment module comprising the above-described water-treatment separation membrane.

The specific kind of water treatment module is not particularly limited, and examples thereof comprise a plate & frame module, a tubular module, a hollow & fiber module, or a spiral wound module, and the like. Furthermore, the other constitutions, manufacturing methods of the water treatment module, and the like are not particularly limited as long as the water treatment module comprises the above-described reverse osmosis membrane according to an exemplary embodiment of the present specification, and a general means publicly known in this field may be adopted without limitation.

Meanwhile, the water treatment module according to an exemplary embodiment of the present specification may be usefully used in a water treatment apparatus such as a domestic/industrial water purification apparatus, a sewage treatment apparatus, and a sea and fresh water treatment apparatus, which has a slight performance deviation and an improved uniformity by using a reverse osmosis membrane having excellent salt rejection and permeation flux and a large effective membrane area.

MODE FOR INVENTION

The following Examples are provided for exemplifying the present invention, and the scope of the present invention is not limited thereby.

Manufacture of Water-Treatment Separation Membrane

Example 1

18 wt % of a polysulfone solid content was put into an N,N-dimethylformamide (DMF) solution, and the resulting mixture was dissolved at 80° C. to 85° C. for 12 hours or more to obtain a uniform liquid phase. The solution was cast to a thickness of 150 μm on a polyester non-woven fabric having a thickness of 95 μm to 100 μm. And then, the cast non-woven fabric was put into water to manufacture a porous polysulfone support.

An aqueous solution comprising 3.6 wt % of meta-phenylene diamine (mPD) was applied onto the porous polysulfone support manufactured by the method to form an aqueous solution layer.

After an organic solution was prepared by adding 0.25 wt % of a trimesoyl chloride (TMC) solution in which an ISOPar (Exxon) solvent was used, the organic solution was applied onto the aqueous solution layer, and then dried to form a polyamide active layer.

Thereafter, a coating is performed by coating a coating solution comprising 0.5 wt % of a random copolymer (weight average molecular weight 30,000, GOHSENX Z-200, Nippon Synthetic Chemical Industry Co., Ltd.) comprising 89.4 wt % of a monomer of the following Chemical Formula 1, 4.0 wt % of a monomer of the following Chemical Formula 2, and 6.6 wt % of a monomer of the following Chemical Formula 3 and using distilled water as a solvent onto the polyamide active layer and then drying the coating solution, thereby manufacturing a water-treatment separation membrane.

[Chemical Formula 1]

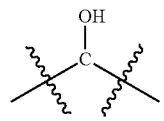

[Chemical Formula 2]

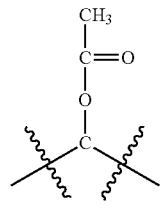

[Chemical Formula 3]

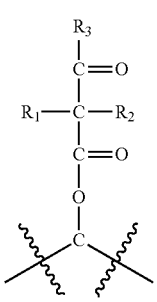

In Chemical Formula 3 applied to Example 1, $R_1$ and $R_2$ are hydrogen, and $R_3$ is a methyl group.

Example 2

A water-treatment separation membrane was manufactured in the same manner as in Example 1, except that the content of the random copolymer comprising the monomer of Chemical Formula 1, the monomer of Chemical Formula 2, and the monomer of Chemical Formula 3 was adjusted to 1 wt %.

Example 3

A water-treatment separation membrane was manufactured in the same manner as in Example 1, except that the content of the random copolymer comprising the monomer of Chemical Formula 1, the monomer of Chemical Formula 2, and the monomer of Chemical Formula 3 was adjusted to 1.5 wt %.

Example 4

A water-treatment separation membrane was manufactured in the same manner as in Example 1, except that the content of the random copolymer comprising the monomer of Chemical Formula 1, the monomer of Chemical Formula 2, and the monomer of Chemical Formula 3 was adjusted to 2 wt %.

Comparative Example 1

A water-treatment separation membrane was manufactured in the same manner as in Example 1, except that the content of the random copolymer comprising the monomer of Chemical Formula 1, the monomer of Chemical Formula 2, and the monomer of Chemical Formula 3 was adjusted to 0.1 wt %.

Comparative Example 2

A water-treatment separation membrane was manufactured in the same manner as in Example 1, except that the content of the random copolymer comprising the monomer of Chemical Formula 1, the monomer of Chemical Formula 2, and the monomer of Chemical Formula 3 was adjusted to 0.25 wt %.

Comparative Example 3

A water-treatment separation membrane was manufactured in the same manner as in Example 1, except that the content of the random copolymer comprising the monomer of Chemical Formula 1, the monomer of Chemical Formula 2, and the monomer of Chemical Formula 3 was adjusted to 5 wt %.

Comparative Example 4

A water-treatment separation membrane was manufactured in the same manner as in Example 1, except that the content of the random copolymer comprising the monomer of Chemical Formula 1, the monomer of Chemical Formula 2, and the monomer of Chemical Formula 3 was adjusted to 10 wt %.

Comparative Example 5

A water-treatment separation membrane was manufactured in the same manner as in Example 1, except that a coating solution comprising 1.0 wt % of a polyvinyl alcohol (molecular weight 130,000) comprising only the following Chemical Formula 1 as the monomer and using distilled water as the solvent was used instead of acetoacetylated polyvinyl alcohol.

[Chemical Formula 1]

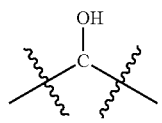

Comparative Example 6

A water-treatment separation membrane was manufactured in the same manner as in Example 1, except that a coating solution comprising 1.5 wt % of a polyvinyl alcohol comprising only Chemical Formula 1 as the monomer was used instead of acetoacetylated polyvinyl alcohol.

Comparative Example 7

A water-treatment separation membrane was manufactured in the same manner as in Example 1, except that a coating solution comprising 2.0 wt % of a polyvinyl alcohol comprising only Chemical Formula 1 as the monomer was used instead of acetoacetylated polyvinyl alcohol.

<Experimental Example 1> Evaluation of Performance of Water-Treatment Separation Membrane The initial salt rejections and the initial permeation fluxes of the water-treatment separation membranes manufactured in Examples 1 to 4 and Comparative Examples 1 to 7 were evaluated by the following method.

In order to measure the salt rejection and the permeation flux (gfd) of the manufactured water-treatment separation membrane, a water treatment module comprising a flat panel-type permeation cell, a high-pressure pump, a storage bath, and a cooling device was used. The structure of the flat panel-type permeation cell was a cross-flow system, and the effective permeation area was 28 cm². After the reverse osmosis separation membrane was mounted on the permeation cell, for the stabilization of the evaluation equipment, the evaluation equipment was sufficiently pre-operated for approximately 1 hour by using tertiary distilled water.

Thereafter, the equipment was operated at a pressure of 225 psi and a flux of 4.5 L/min for approximately 1 hour by using an aqueous sodium chloride solution having a concentration of 2,000 ppm, so that it was confirmed that the equipment was stabilized, and then a flux was calculated by measuring the amount of water permeated at 25° C. for 15 minutes, and a salt rejection was calculated by analyzing the salt concentration before and after the permeation using a conductivity meter.

The salt rejections and permeation fluxes of the water treatment separation membranes manufactured in Examples 1 to 4 and Comparative Examples 1 to 7 were evaluated by the above-described method, and the measurement results are shown in the following Table 1.

TABLE 1

| | Protective layer material | Weight ratio (wt %) | Performance Rej. (%) | Flux (GFD) |
|---|---|---|---|---|
| Example 1 | Acetoacetylated polyvinyl alcohol | 0.5 | 99.67 | 21.60 |
| Example 2 | Acetoacetylated polyvinyl alcohol | 1 | 99.68 | 22.03 |
| Example 3 | Acetoacetylated polyvinyl alcohol | 1.5 | 99.64 | 21.64 |
| Example 4 | Acetoacetylated polyvinyl alcohol | 2 | 99.64 | 21.47 |
| Comparative Example 1 | Acetoacetylated polyvinyl alcohol | 0.1 | 99.29 | 18.98 |
| Comparative Example 2 | Acetoacetylated polyvinyl alcohol | 0.25 | 99.47 | 20.86 |
| Comparative Example 3 | Acetoacetylated polyvinyl alcohol | 5 | 99.48 | 18.21 |
| Comparative Example 4 | Acetoacetylated polyvinyl alcohol | 10 | 99.44 | 17.54 |
| Comparative Example 5 | Polyvinyl alcohol | 1 | 99.48 | 19.31 |
| Comparative Example 6 | Polyvinyl alcohol | 1.5 | 99.57 | 20.13 |
| Comparative Example 7 | Polyvinyl alcohol | 2 | 99.62 | 22.15 |

Referring to Table 1, it could be seen that the cases where the coating solution comprised 0.5 wt %, 1 wt %, 1.5 wt %, and 2 wt % of acetoacetylated polyvinyl alcohol had both improved salt rejections and improved fluxes, as compared to the cases where the coating solution comprised 1 wt %, 1.5 wt %, and 2 wt % of polyvinyl alcohol.

Further, it could be seen that the case where the coating solution comprised 0.5 wt % to 2 wt % of acetoacetylated polyvinyl alcohol significantly increased a salt rejection and a flux as compared to the case where the coating solution comprised less than 0.5 wt % or more than 2 wt % of acetoacetylated polyvinyl alcohol.

<Experimental Example 2> Measurement of Fouling Resistance and Chemical Resistance In order to evaluate fouling resistance and chemical resistance through a confirmation of a change in performance of the separation membrane, which was caused by contaminants, and a change in performance of the separation membrane after a chemical cleaning for removing contaminants, the performance was observed over time while the separation membrane was exposed to the contaminants (foulant, skim milk) and the contaminants adhered to the surface of the separation membrane were removed through the chemical cleaning.

In order to measure the salt rejection and the permeation flux (gfd) of the manufactured water-treatment separation membrane, a water treatment module comprising a flat panel-type permeation cell, a high-pressure pump, a storage bath, and a cooling device was used. The structure of the flat panel-type permeation cell was a cross-flow system, and the effective permeation area was 28 cm$^2$. After the reverse osmosis separation membrane was mounted on the permeation cell, for the stabilization of the evaluation equipment, the evaluation equipment was sufficiently pre-operated for approximately 1 hour by using tertiary distilled water. Thereafter, it was confirmed that the equipment was operated at a pressure of 225 psi and a flux of 4.5 L/min for approximately 1 hour by injecting skim milk at a concentration of 50 ppm into an aqueous sodium chloride solution having a concentration of 2,000 ppm, so that it was confirmed that the equipment was stabilized, and then a flux was calculated by measuring the amount of water permeated at 25° C. for 15 minutes, and a salt rejection was calculated by analyzing the salt concentration before and after the permeation using a conductivity meter. Thereafter, while the performance of the separation membrane was decreased by a level of 50% as compared to the initial flux, the flux and the salt rejection were measured at a predetermined time interval.

A chemical cleaning was carried out in order to remove the contaminants of the contaminated separation membrane. For the chemical cleaning, a NaOH solution with a pH of 12 was circulated inside the flat panel-type permeation cell by operating the equipment at a flux of 4.5 L/min for approximately 30 minutes, and then circulated inside the flat panel-type permeation cell by performing soaking for approximately 60 minutes, and operating the equipment again for approximately 30 minutes. Thereafter, NaOH remaining inside the flat panel-type permeation cell was removed by operating the equipment at a flux of 4.5 L/min for approximately 30 minutes using distilled water. Thereafter, an HCl (or citric acid) solution with a pH of 2 was circulated inside the flat panel-type permeation cell by operating the equipment at a flux of 4.5 L/min for approximately 30 minutes, and then circulated inside the flat panel-type permeation cell by performing soaking for approximately 60 minutes, and operating the equipment again for approximately 30 minutes. Thereafter, the HCl (or citric acid) solution remaining inside the flat panel-type permeation cell was removed by operating the equipment using distilled water at a flux of 4.5 L/min for approximately 30 minutes, and then the equipment was operated by using sodium chloride having a concentration of 2,000 ppm at a pressure of 225 psi and a flux of 4.5 L/min for approximately 1 hour, so that it was confirmed that the equipment was stabilized, and then a flux was calculated by measuring the amount of water permeated at 25° C. for 15 minutes, and a salt rejection was calculated by analyzing the salt concentration before and after the permeation using a conductivity meter.

TABLE 2

| Time (hr) | Separation membrane to which the existing PVA is applied (Comparative Example 7) | Separation membrane to which the acetoacetylated PVA is applied (Example 2) | Separation membrane to which the existing PVA is applied (Comparative Example 7) | Separation membrane to which the acetoacetylated PVA is applied (Example 2) |
|---|---|---|---|---|
| | Change in flux | | Change in rejection (%) | |
| 0 | 100.00% | 100.00% | 0 | 99.81 |
| 1 | 91.17% | 93.22% | −0.03 | −0.03 |
| 2 | 90.47% | 94.45% | −0.02 | −0.03 |
| 3 | 92.41% | 95.64% | −0.01 | −0.02 |
| 4 | 94.23% | 98.72% | 0 | −0.01 |
| 6 | 94.11% | 97.53% | +0.01 | 0 |
| 8 | 87.68% | 93.39% | +0.02 | 0 |
| 22 | 73.90% | 81.90% | −0.08 | −0.07 |
| 25 | 70.18% | 79.79% | −0.17 | −0.10 |
| 28 | 59.99% | 70.32% | −0.14 | −0.12 |
| 30 | 58.29% | 70.45% | −0.13 | −0.11 |
| | Chemical cleaning | | Chemical cleaning | |
| 1 | 83.62% | 94.01% | −0.12 | −0.11 |
| 10 | 86.41% | 95.11% | −0.08 | −0.08 |
| 13 | 84.66% | 95.20% | −0.08 | −0.08 |
| 16 | 84.66% | 94.14% | −0.09 | −0.07 |

Referring to Table 2, it was confirmed that when the membrane to which the existing polyvinyl alcohol was applied (Example 7) was exposed to contaminants for 30 hours, the flux and the rejection were decreased by 41.71% and 0.13%, respectively, as compared to the initial flux and the initial rejection, but it could be seen that the flux and the rejection of the separation membrane to which acetoacetylated polyvinyl alcohol was applied (Example 2) were decreased by 29.55% and 0.11%, respectively, under the same conditions as compared to the initial flux and the initial rejection.

Further, it was confirmed that in the case of the membrane to which the existing polyvinyl alcohol was applied (Example 7), after the chemical cleaning (pH 12→2), the flux and the rejection were decreased by 15.34% and 0.07%, respectively, as compared to the initial flux and the initial rejection, but it could be seen that the flux and the rejection the separation membrane to which acetoacetylated PVA was applied (Example 2) were decreased by 5.86% and 0.07%, respectively, under the same conditions as compared to the initial flux and the initial rejection.

It can be seen that the results exhibit separation membrane characteristics suggested by the present invention in which anti-fouling characteristics (inhibition of reduction in performance) and chemical resistance (an improvement in the recovery of performance after chemical cleaning) are improved.

Although the preferred exemplary embodiments of the present invention have been described above, the present invention is not limited thereto, and various modifications can be made and carried out within the scope of the claims and the detailed description of the invention, and also fall within the scope of the invention.

The invention claimed is:

1. A method for manufacturing a water-treatment separation membrane, the method comprising:
preparing a porous support;
forming a polyamide active layer on the porous support by using an interfacial polymerization of an aqueous solution comprising an amine compound and an organic solution comprising an acyl halide compound; and
coating a coating solution comprising a random copolymer comprising monomers represented by the following Chemical Formulae 1 to 3 onto the polyamide active layer,
wherein a content of the random copolymer is 0.5 wt % to 2 wt % based on a total weight of the coating solution:

[Chemical Formula 1]
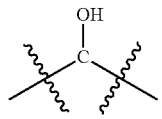

[Chemical Formula 2]
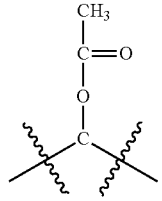

[Chemical Formula 3]
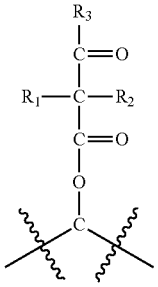

in Chemical Formulae 1 to 3,
a content of the monomer of Chemical Formula 1 is 70 wt % to 90 wt % based on the entire random copolymer, a content of the monomer of Chemical Formula 2 is 5 wt % to 25 wt % based on the entire random copolymer, a content of the monomer of Chemical Formula 3 is 5 wt % to 25 wt % based on the entire random copolymer, and $R_1$ to $R_3$ are the same as or different from each other, and are each independently hydrogen; or a substituted or unsubstituted alkyl group.

2. The method of claim 1, wherein a solvent of the coating solution is a hydrophilic solvent.

3. The method of claim 1, wherein $R_1$ to $R_3$ are the same as or different from each other, and are each independently hydrogen; or a substituted or unsubstituted alkyl group having 1 to 20 carbon atoms.

4. The method of claim 1, wherein $R_1$ and $R_2$ are hydrogen.

5. A water-treatment separation membrane manufactured by the manufacturing method of claim 1, the water-treatment separation membrane comprising:
  a porous support;
  a polyamide active layer disposed on the porous support; and
  a coating layer comprising a random copolymer comprising a monomer of the following Chemical Formula 1, a monomer of the following Chemical Formula 2, and a monomer of the following Chemical Formula 3 on the polyamide active layer:

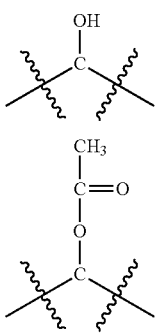

[Chemical Formula 1]

[Chemical Formula 2]

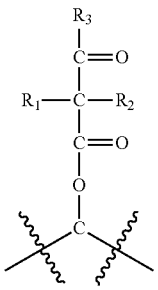

[Chemical Formula 3]

in Chemical Formulae 1 to 3, a content of the monomer of Chemical Formula 1 is 70 wt % to 90 wt % based on the entire random copolymer, a content of the monomer of Chemical Formula 2 is 5 wt % to 25 wt % based on the entire random copolymer, a content of the monomer of Chemical Formula 3 is 5 wt % to 25 wt % based on the entire random copolymer, and $R_1$ to $R_3$ are the same as or different from each other, and are each independently hydrogen; or a substituted or unsubstituted alkyl group.

6. The water-treatment separation membrane of claim 5, wherein $R_1$ to $R_3$ are the same as or different from each other, and are each independently hydrogen; or a substituted or unsubstituted alkyl group having 1 to 20 carbon atoms.

7. The water-treatment separation membrane of claim 5, wherein $R_1$ and $R_2$ are hydrogen.

8. A water treatment module comprising the water-treatment separation membranes of claim 5.

* * * * *